July 17, 1962 B. M. MINDES 3,045,114
DIVERSITY COMBINING SYSTEM
Filed Jan. 27, 1959
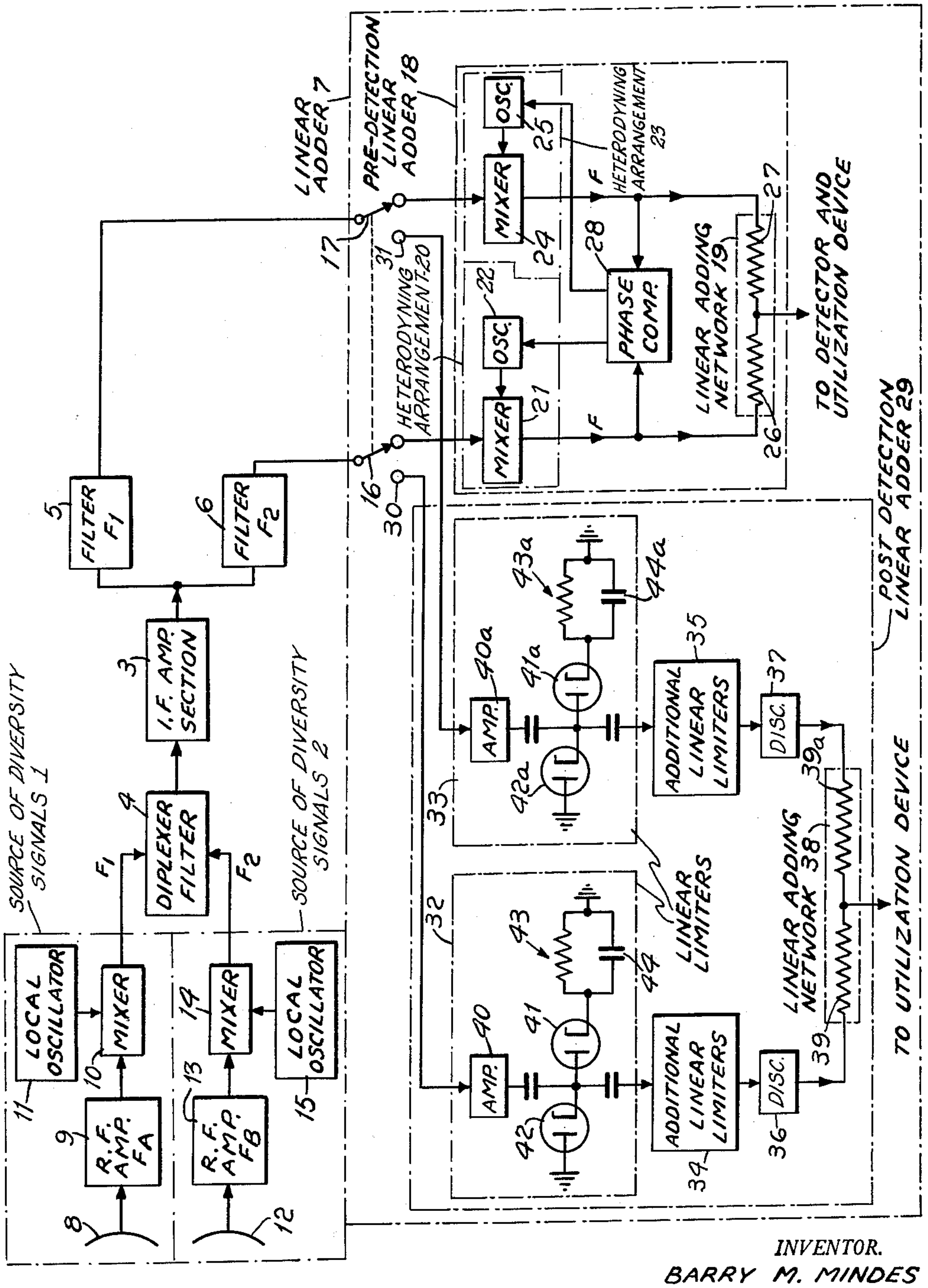
INVENTOR.
BARRY M. MINDES
BY *Alfred C. Hill*
AGENT

United States Patent Office 3,045,114

Patented July 17, 1962

3,045,114

DIVERSITY COMBINING SYSTEM

Barry M. Mindes, New York, N.Y., assignor to International Telephone and Telegraph Corporation, Nutley, N.J., a corporation of Maryland Filed Jan. 27, 1959, Ser. No. 789,287
8 Claims. (Cl. 325—433)

This invention relates to diversity receiving systems and more particularly to a simplified diversity combining system for use in diversity communication systems.

In communication systems which experience signal fading, such as, but not necessarily restricted thereto, beyond-the-horizon communication systems, diversity reception can be employed to reduce the effects of signal fading. Diversity reception requires that at least two signal paths be provided so that the signals following these paths are uncorrelated as to fading. The uncorrelated signals can be provided by employing spaced antennas, spaced carrier frequencies or receiving signals at spaced times. Independent of the means by which the separate uncorrelated signals are obtained, there is required a receiving arrangement to capitalize on the resultant diversity advantage. In a general sense the arrangements to capitalize on the diversity advantage may be divided into two categories, (1) switching diversity or (2) combining diversity. In switching diversity, the quality of the signals from each receiving system is compared and the best signal is selected while the other signals are rejected. In combining diversity, the signals received in a diversity system are combined by addition in controlled proportions to provide a better signal-to-noise ratio than that of any signal receiver. This signal-to-noise improvement is possible because the noise voltage components are random in character and add in root mean square fashion while the signals add linearly. The combining diversity arrangement has a further advantage that no switching transients will occur such as will occur in switching diversity arrangements.

In the past it was believed necessary that diversity receivers had to receive and operate on signals which were completely uncorrelated to obtain diversity advantages. However, it has been discovered that diversity advantage can be obtained if the diversity signals are up to 60% correlated. Hence, it is to be understood that in the description of this invention the diversity signals may be completely uncorrelated as mentioned above or may be up to 60% correlated.

It is to be understood that the simplified diversity combining arrangement herein will operate in diversity communication systems employing any type of modulation. The description hereinbelow, however, will be directed toward angular modulation, such as frequency (FM) or phase (PM) modulation.

The combining diversity arrangement hereindescribed is a form of equal gain combining arrangement. In this form of combining arrangement, it is necessary to have equal gain (equal noise) in each channel to achieve optimum linear addition with the combining of the diversity signals taking place before or after signal detection. This type of combining arrangement in the past has employed an intermediate frequency (IF) amplifier for each diversity signal channel and a common automatic gain control (AGC) system operating to adjust the IF amplifiers of each signal channel periodically for equal gain characteristics.

An object of this invention is to provide a diversity combining system employing the equal gain combining techniques of the prior art but which have certain advantages over these prior art systems.

Another object of this invention is the provision of a diversity combining system employing a minimum amount of equipment necessary to realize a diversity advantage utilizing equal gain combining techniques.

Still another object of this invention is the provision of an equal gain combining diversity system which does not require a common AGC system to control the gain characteristics of an amplifier disposed in each diversity signal channel.

A feature of this invention is to provide a signal combiner operable on a diversity signal having a first center frequency and a second diversity signal having a second center frequency and a common means to amplify the first and second diversity signals. The output of the common means is then operated upon to linearly add the signals of said first and second sources.

Another feature of this invention is to provide a signal combiner incorporating a common amplifier system to amplify substantially equally diversity signals having a first center frequency and a second center frequency and then employing either a predetection or post-detection combining arrangement to linearly add either the diversity signals themselves or the detected modulation carried thereby.

Still another feature of this invention is the provision of filter means at the output of the common amplifier system to separate the diversity signals into two separate diversity signal channels so that they may be operated upon by either predetection or post-detection combining systems of the linear adder type to achieve the desired diversity advantage.

The above-mentioned and other features and objects of this invention will become more apparent by reference to the following description taken in conjunction with the accompanying drawing, the sole FIGURE of the drawing illustrating in block diagram form a diversity combining system following the principles of this invention.

Referring to the FIGURE of the drawing, there is illustrated therein a diversity combining system following the principles of this invention including a first source of diversity signals 1 having a center frequency $F_1$ and a second source of diversity signals 2 having a center frequency $F_2$ coupled to a common means illustrated as IF amplifier section 3. Diversity signals $F_1$ and $F_2$ are coupled to amplifier section 3 by means of diplexer filter 4 so that the two diversity signals $F_1$ and $F_2$ may be amplified in the same amplifier section 3 without degradation of the noise figure. It should be remembered, however, that the diversity signals $F_1$ and $F_2$ may be coupled directly to amplifier section 3 if degradation of the noise figure is not a serious problem. Amplifier section 3, common to the two diversity signals $F_1$ and $F_2$, must have a bandwidth sufficient to pass the diversity signals $F_1$ and $F_2$ with their associated modulation, said amplifier section providing substantial equal gain for both of these diversity sgnals. By way of example the two center frequencies $F_1$ and $F_2$ might be 68 mc. and 72 mc., respectively, with each having a modulation bandwidth of ½ mc. It would be necessary then that amplifier section 3 have a bandwidth of at least 5 megacycles to equally amplify the signals of $F_1$ and $F_2$.

The output of amplifier section 3 is separated into two diversity signal paths by the employment of filter 5 which responds to diversity signal $F_1$ and filter 6 which responds to diversity signal $F_2$. The output of these filter circuits 5 and 6, are coupled to linear adder 7 to linearly add the signals of sources 1 and 2.

Referring with more particularity to the diversity signal sources, the FIGURE of the drawing illustrates that source 1 includes an antenna 8, a radio frequency amplifier 9 to amplify the signals received by antenna 8, a mixer 10 and a local oscillator 11 cooperating to heterodyne the received signal to produce an intermediate frequency diversity signal $F_1$. Source 2 is illustrated as including an antenna 12, radio frequency amplifier 13 to amplify the signals received on antenna 12, mixer 14 and oscillator 15 cooperating to produce from the output of amplifier 13 an intermediate frequency diversity signal $F_2$.

Sources 1 and 2 may be a portion of a space diversity receiving system which would require that amplifiers 9 and 13 respond to the same frequency, hence $F_A$ and $F_B$ would be equal, and that antennas 8 and 12 be physically spaced the desired amount to provide two signal paths from a distance transmitter such that uncorrelated signals as to fading are received on antennas 8 and 12. The frequency of local oscillators 11 and 15 would be adjusted to provide the desired intermediate frequency diversity signals $F_1$ and $F_2$.

Sources 1 and 2 could also form a part of a frequency diversity receiving system. This would require that antennas 8 and 12 be closely spaced physically with amplifiers 9 and 13 responding to frequency spaced signals $F_A$ and $F_B$ wherein the frequencies $F_A$ and $F_B$ are spaced a sufficient amount to provide the desired uncorrelated signals for reception by antennas 8 and 12.

Regardless of how the uncorrelated signals are derived and regardless of the frequencies thereof (the same or spaced frequencies) it is necessary to arrange the frequency of local oscillators 11 and 15 to provide the desired separated intermediate frequency signals $F_1$ and $F_2$ at the output of mixers 10 and 14 for coupling to the common IF amplifier section 3.

As discussed hereinabove the output of the common amplifier section 3, the diversity signals $F_1$ and $F_2$, are separated by filters 5 and 6 to provide two separated diversity signals which may be operated upon by a combining arrangement such as linear adder 7 to provide the desired diversity advantage. The utilization of a common amplifier section 3 eliminates the necessity of employing a common AGC system as heretofore was the practice with consequent saving in the total number of tubes used for IF amplification, and also other complications that arise such as gain adjustment in the common AGC arrangement. Amplifier section 3 may include its own AGC arrangement to maintain a substantially constant level output from section 3 but of course this AGC arrangement does not encompass the difficulties present in common AGC arrangements heretofore employed.

In accordance with the FIGURE of the drawing, linear adder 7 may take several forms two of which are illustrated. If switches 16 and 17 are in the position illustrated the output of filters 5 and 6 are coupled to predetection linear adder 18 which is illustrated as including an arrangement to render the frequency of signals $F_1$ and $F_2$ equal and to adjust the phase relationship thereof so that these signals may be added substantially inphase in linear adding network 19. Signals $F_1$ and $F_2$ are rendered frequency coincident by utilizing a heterodyning arrangement 20 which includes a mixer 21 and an oscillator 22 and a heterodyning arrangement 23 which includes mixer 24 and oscillator 25. The output of mixers 21 and 24, indicated as F, are coupled to the linear adding network 19 illustrated to include resistors 26 and 27 and hence are added together to provide a single signal for coupling to a detector and utility device. To obtain optimum addition of the outputs of mixers 21 and 24 in network 19, it is necessary that the phase of these signals be substantially phase coincident and hence phase comparator 28 responds to the outputs of mixers 21 and 24 to produce a control signal to adjust oscillators 22 and 25 in a push-pull arrangement, as illustrated, so that the outputs of mixers 21 and 24 are rendered substantially phase coincident for optimum addition in network 19.

Should it be desired to combine the outputs of filters 5 and 6 in a post-detection linear adder 29 switches 16 and 17 would be moved to contacts 30 and 31. This movement of switches 16 and 17 thereby couples the outputs of filters 5 and 6 to linear adder 29 which is of the post-detection equal gain type which is specifically illustrated to include linear limiter 32 coupled to the output of filter 6 and linear limiter 33 coupled to the output of filter 5. If desired, additional linear limiters may be employed in each of the output paths from filters 5 and 6 as indicated by blocks 34 and 35. The output of the linear limiters is applied to discriminators 36 and 37 to respectively demodulate the signal having the center frequency $F_2$ and the signal having the center frequency $F_1$. The intelligence signal at the output of discriminators 36 and 37 is applied to linear adding network 38, which may take the form of a hybrid, or as illustrated, resistors 39 and 39*a*. Hence, in the post-detection combining arrangement illustrated by dotted box 29, the intelligence signals are combined after recovery from the intermediate frequency signals $F_1$ and $F_2$. The action of the linear limiters is such as to provide equal gain from the input of the post-detection combining arrangement 29 to a point following the discriminators 36 and 37. The linear limiters are limiters which exhibit a characteristic wherein the output signal level varies in accordance with the input signal level. Thus, the relative amplitudes of the signals applied to the input thereof are preserved or the ratio is increased at the discriminator outputs to thereby enable the linear addition of the detected outputs to achieve diversity advantage. The linear limiter is a type of limiter which may be termed an A.C. limiter acting to suppress or greatly reduce rapid variations in signal amplitude but which does not exhibit a permanent change in gain when the long term average signal level increases or decreases.

There are many types of limiter circuits which behave as set forth above and thereby provide the desired action. The schematic illustration in the blocks identified as linear limiters 32 and 33 indicate one form of limiter which will enable the achievement of the desired maintenance of signal ratio at the input of combining circuit 29 at the output of discriminators 36 and 37. Linear limiters 32 and 33 are illustrated as including amplifier 40, the output of which is coupled to a pair of series connected diodes 41 and 42 with the anode of diode 42 being connected to ground and the cathode of diode 41 being connected to a time constant circuit 43. The action of this linear limiter is as follows. When diodes 41 and 42 conduct, a charge is stored on condenser 44 of the time constant circuit 43 to establish a diode bias or a limiting level. The time constant of the time constant circuit 43 does not permit the limiting level to fluctuate rapidly but the capacitor charge and hence the limiting level will adjust automatically to long-term signal level changes. For instantaneous amplitude fluctuations of the signal applied from filters 5 and 6, the diodes 41 and 42 will act to limit the amplitude level of the output of amplifier 40 to the bias level established at condenser 44, since diodes 41 and 42 will not conduct for signals that exceed this limiting level. However, if the signal amplitude coupled to diodes 41 and 42 should change in a long-term manner, that is, a steady increase or a steady decrease for a sufficient period of time, the charge on condenser 44 will change to adjust the limiting or bias level to this new long-term signal level change and hence there is no permanent change in the gain of the linear limiter. This arrangement thereby provides a limiter whose output signal level varies with the input signal strength and thereby maintains equal gain from the outputs of filters 5 and 6 to a point following discriminators 36 and 37. With this type of limiter, namely, the linear limiter or A.C. limiter, the noise present in the system is maintained substantially constant or may even decrease slightly. Hence, if the signal level decreases the noise of this post-detection combining arrangement does not increase. It is for this reason that this type of post-detection combining arrangement has an advantage over other known types of post-detection diversity combining systems since the other types of post-detection diversity combining systems have a characteristic wherein the noise in the receiver tends to increase as the signal decreases.

By employing the arrangement of this invention, it is obvious that an economic saving is realized since only one IF amplifier section is required rather than the heretofore employed two IF amplifier sections. There is also provided the elimination of the complexity inherent in the previously employed common AGC arrangements required to maintain equal gain in the two IF amplifier sections.

While I have described above the principles of my invention in connection with specific apparatus, it is to be clearly understood that this description is made only by way of example and not as a limitation to the scope of my invention as set forth in the objects thereof and in accompanying claims.

I claim:

1. A diversity signal combiner comprising a first source of diversity signals including a carrier having a first frequency modulated by intelligence, a second source of diversity signals including a carrier having a second frequency spaced from said first frequency modulated by said intelligence, common means coupled to the output of said first and second sources to amplify said first and second diversity signals, and means coupled to the output of said common means to linearly add signals of said first and second sources.

2. A diversity signal combiner comprising a first source of diversity signals including a carrier having a first frequency modulated by intelligence, a second source of diversity signals including a carrier having a second frequency spaced from said first frequency modulated by said intelligence, an amplifier system having a bandwidth encompassing both the signals of said first and second sources coupled to the output of said first and second sources to amplify said first and second diversity signals, and means coupled to the output of said amplifier system to linearly add signals of said first and second sources.

3. A diversity signal combiner comprising a first source of diversity signals including a carrier having a first frequency modulated by intelligence, a second source of diversity signals including a carrier having a second frequency spaced from said first frequency modulated by said intelligence, common means coupled to the output of said first and second sources to amplify said first and second diversity signals, a first filter means responsive to signals of said first source coupled to the output of said common means, a second filter means responsive to signals of said second source coupled to the output of said common means, and means coupled to the output of said filter means to linearly add signals of said first and second sources.

4. A diversity signal combiner comprising a first source of diversity signals including a carrier having a first frequency modulated by intelligence, a second source of diversity signals including a carrier having a second frequency spaced from said first frequency modulated by said intelligence, an amplifier system having a bandwidth encompassing both the signals of said first and second sources coupled to the output of said first and second sources to amplify said first and second diversity signals, a first filter means responsive to the signals of said first source coupled to said amplifier system, a second filter means responsive to signals of said second source coupled to the output of said amplifier system, and means coupled to the output of said filter means to linearly add signals of said first and second sources.

5. A diversity signal combiner comprising a first source of diversity signals including a carrier having a first frequency modulated by intelligence, a second source of diversity signals including a carrier having a second frequency spaced from said first frequency modulated by said intelligence, common means coupled to the output of said first and second sources to amplify said first and second diversity signals, a first filter means responsive to signals of said first source coupled to the output of said common means, a second filter means responsive to signals of said second source coupled to the output of said common means, and a predetection linear adder coupled to the output of said filter means to linearly add signals of said first and second sources.

6. A diversity signal combiner comprising a first source of diversity signals, including a carrier having a first frequency modulated by intelligence, a second source of diversity signals including a carrier having a second frequency spaced from said first frequency modulated by said intelligence, an amplifier system having a bandwidth encompassing both the signals of said first and second sources coupled to the output of said first and second sources to amplify said first and second diversity signals, a first filter means responsive to the signals of said first source coupled to said amplifier system, a second filter means responsive to signals of said second source coupled to the output of said amplifier system, and a predetection linear adder coupled to the output of said filter means to linearly add signals of said first and second sources.

7. A diversity signal combiner comprising a first source of diversity signals including a carrier having a first frequency modulated by intelligence, a second source of diversity signals including a carrier having a second frequency spaced from said first frequency modulated by said intelligence, common means coupled to the output of said first and second sources to amplify said first and second diversity signals, a first filter means responsive to signals of said first source coupled to the output of said common means, a second filter means responsive to signals of said second source coupled to the output of said common means, and a post-detection linear adder coupled to the output of said filter means to linearly add signals of said first and second sources.

8. A diverstiy signal combiner comprising a first source of diversity signals including a carrier having a first frequency modulated by intelligence, a second source of diversity signals including a carrier having a second frequency spaced from said first frequency modulated by said intelligence, an amplifier system having a bandwidth encompassing both the signals of said first and second sources coupled to the output of said first and second sources to amplify said first and second diversity signals, a first filter means responsive to the signals of said first source coupled to said amplifier system, a second filter means responsive to signals of said second source coupled to the output of said amplifier system, and a post-detection linear adder coupled to the output of said filter means to linearly add signals of said first and second sources.

References Cited in the file of this patent

UNITED STATES PATENTS

| | | |
|---|---|---|
| 1,948,671 | Potter | Feb. 27, 1934 |
| 2,027,022 | Conklin | Jan. 7, 1936 |
| 2,069,813 | Beverage | Feb. 9, 1937 |
| 2,269,594 | Mathes | Jan. 13, 1942 |
| 2,413,543 | Carlson | Dec. 31, 1946 |
| 2,520,188 | Yando | Aug. 29, 1950 |
| 2,549,423 | Carlson | Apr. 17, 1951 |
| 2,683,213 | Earp | July 6, 1954 |
| 2,786,133 | Dyke | Mar. 19, 1957 |
| 2,835,800 | Day | May 20, 1958 |
| 2,903,576 | Altman | Sept. 8, 1959 |
| 2,903,577 | Adams | Sept. 8, 1959 |

OTHER REFERENCES

Article (1) "Simplified Diversity Communication . . .," Altman et al., Electrical Comm., June 1956, pages 151–164.